United States Patent [19]
Luedke et al.

[11] Patent Number: 5,795,475
[45] Date of Patent: Aug. 18, 1998

[54] COUPLER/DIVERTER FOR COUNTER-TOP RO FILTER

[75] Inventors: Frederick L. Luedke, Waterbury, Conn.; Ryan K. Hur, Irvine, Calif.; Dirk Yoshida, Los Angeles, Calif.

[73] Assignee: Neoperl, Inc., Waterbury, Conn.

[21] Appl. No.: 679,187

[22] Filed: Jul. 12, 1996

[51] Int. Cl.[6] ............................ B01D 27/08; B01D 35/157
[52] U.S. Cl. .............................. 210/257.2; 210/416.3; 210/428; 210/460; 137/625.17; 251/156; 251/309
[58] Field of Search ........................ 210/232, 257.2, 210/416.3, 416.1, 424, 428, 460, 257.1; 137/562, 625, 625.17, 625.15, 625.21, 625.23, 625.25, 625.31, 625.46; 251/155, 156, 304, 309, 314

[56] References Cited

U.S. PATENT DOCUMENTS

| | | |
|---|---|---|
| D. 291,479 | 8/1987 | Padilla et al. . |
| 1,553,299 | 9/1925 | Adams . |
| 2,476,172 | 7/1949 | Williams . |
| 3,342,335 | 9/1967 | Gamundi et al. . |
| 3,428,089 | 2/1969 | Kachergis ................ 137/625.29 |
| 3,444,890 | 5/1969 | Ralston ..................... 137/562 |
| 3,670,892 | 6/1972 | Baerg et al. . |
| 4,026,323 | 5/1977 | Goodlaxson ................ 137/562 |
| 4,078,573 | 3/1978 | Shames et al. . |
| 4,124,165 | 11/1978 | Jarvis et al. .............. 137/562 |
| 4,556,484 | 12/1985 | Hunter et al. . |
| 4,599,171 | 7/1986 | Padilla et al. . |
| 4,606,823 | 8/1986 | Lucas, III ................. 210/282 |
| 4,678,002 | 7/1987 | Valley ..................... 137/625.31 |
| 4,744,895 | 5/1988 | Gales et al. . |
| 5,078,864 | 1/1992 | Whittier . |
| 5,188,149 | 2/1993 | Williams .................. 137/625.47 |
| 5,194,156 | 3/1993 | Tomchak . |

*Primary Examiner*—W. L. Walker
*Attorney, Agent, or Firm*—Dallett Hoopes

[57] ABSTRACT

Coupler/diverter has housing with an aerator at the bottom and an inner barrel having rotary valving stem serving to distribute supply water, brine and overflow from RO filter. Depending on the setting, the stem permits flow through the housing to issue in the usual aerated stream. At this setting it also shuts off all other flow for decoupling. In diverting setting it sends supply to filter, shuttles return brine flush to the outside of the housing and lets reservoir overflow pass through the aerator. In a working setting the stem also can control volume of brine return to a varying degree to optimize the operation of the RO filter.

11 Claims, 10 Drawing Sheets

COUPLER/DIVERTER FOR COUNTER-TOP RO FILTER

FIELD OF THE INVENTION

This invention relates to a coupler/diverter which couples to a nipple on a conventional sink faucet spout and diverts flow to a counter-top reverse osmosis filter. The coupler/diverter of the invention also is connected to and accommodates the brine flow from the filter and the overflow of filtered water when an excess is produced. At a non-diverting setting it also allows normal operation of the faucet with the coupler/diverter in place to deliver an aerated stream into the sink.

BACKGROUND OF THE INVENTION

In the past it has been customary when providing a reverse osmosis filter for a sink to install an under-the-counter filter separately plumbed into the cold water supply and having an outlet and controls at the sink-top level spaced from the sink faucet. An example of such an arrangement is shown in the Astl U.S. Pat. No. 4,210,533 which issued Jul. 1, 1980. Such a plumbed installation includes a cold water line supplying water to the filter, a brine outlet to the control, a brine return to the filter and a purified water line to the second faucet. Such plumbed installations have been expensive, both in plumber's time and additional fittings. There has been a need for a less expensive arrangement.

For this purpose a coupler has been designed, as shown in the U.S. Pat. No. 4,599,171 issued Jul. 8, 1986 to Padilla et al., featuring a quick-connect attachment of the filter hoses to a nipple on the regular faucet spout. Typically, such an arrangement includes an attachment for a supply hose to the filter and attachments for the filtered water overflow and the brine waste. The overflow has passed through such a fitting and the brine has as well, a metering valve being provided in the brine line to meter the amount of brine flowing through to control the back pressure on the filter.

Quick-connect couplers adapted to be connected to a faucet spout and shunt water off to a dishwasher and receive the waste water back and direct it into the sink have been around for some time. Shames et al U.S. Pat. No. 4,078,575 issued Mar. 14, 1978 is an example.

In the quick-connect couplers for use with RO filters of the past there has been no provision for flow-through of the ordinary faucet water. In the event the user has wanted to wash his hands, for instance, he has had to disconnect the coupling from the faucet, thereby permitting the faucet water to flow into the sink.

SUMMARY OF THE INVENTION

The present invention is a coupler/diverter permitting the flow-through and, in addition, aerating the faucet water so that the faucet water can be used directly without removing the quick-connect coupling from its installation on the faucet. A further object of the invention is to provide for disposal of the brine waste separate and apart from the aerator stream. It includes a simple single control to variously control the water supply, the rate of brine flow and the overflow.

Structurally, the invention comprises a housing having a coupling at its upper end adapted to releasably engage a sink nipple and having at its lower end an aerator and discharge orifice. Inbetween the housing is formed with a lateral brine outlet, and internally a tubular barrel unitary with and transverse of the housing. Three hose nipples with passages are formed at the side of the housing.

A control stem is rotatably received into the barrel having integral therewith a handle external of the housing, the stem and barrel and housing having passages connected to the lateral brine outlet and the discharge orifice. Hoses may connect the nipples to the supply, the brine return and the treated water overflow of an RO filter.

For a first rotary setting of the handle, water will flow through passages from the coupling to the discharge orifice and the supply hose, overflow hose and the brine return hose will be closed by the stem. For a second setting of the handle water will flow from the coupling through passages to the supply hose, overflow water will flow from the overflow hose through passages to the discharge orifice and return brine will flow from the return brine hose through passages out the lateral brine outlet. For a third setting of the handle water will flow from the coupling through passages to the supply hose, overflow water will flow from the overflow hose through passages to the discharge orifice and return brine will flow from the return hose through passages out the lateral brine outlet at a restricted rate.

BRIEF DESCRIPTION OF THE DRAWINGS

Further objects and features of the invention will be understood by those skilled in the art after reference to the accompanying drawings and specification, all of which disclose a non-limiting embodiment of the invention. In the drawings.

DESCRIPTION OF THE PREFERRED EMBODIMENT

Figure 1:
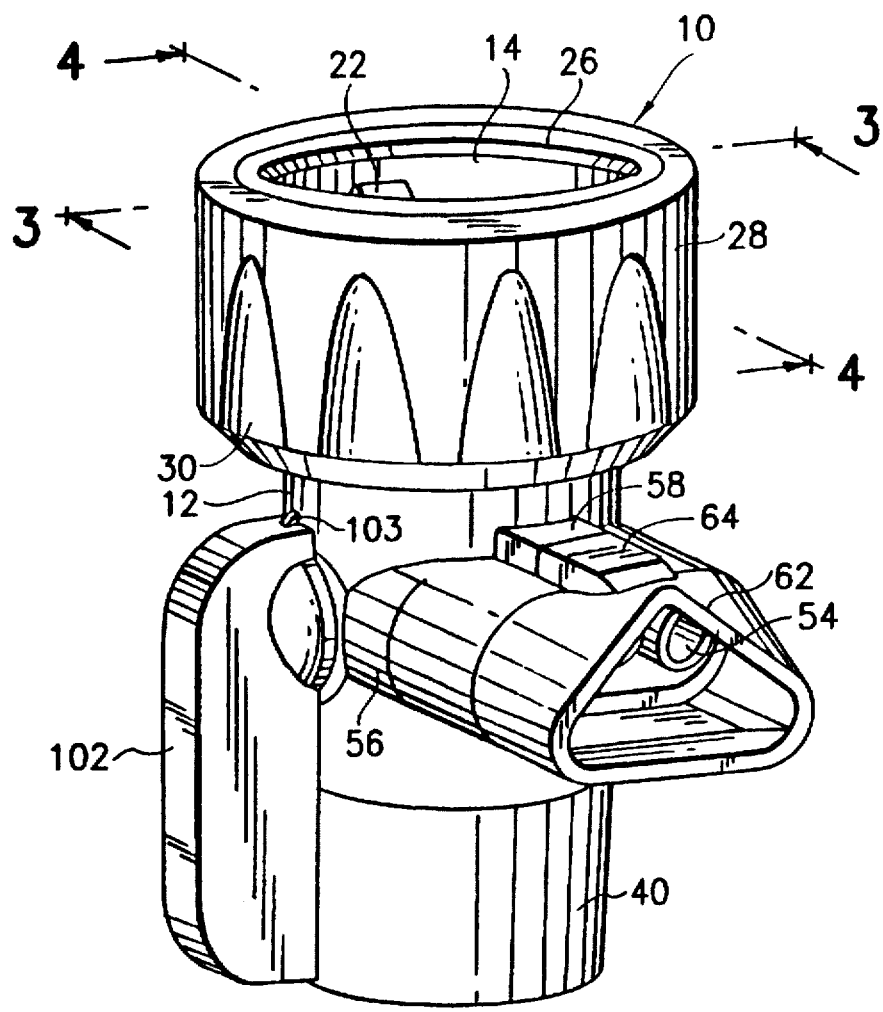
FIG. 1 is a perspective view of the coupler/diverter embodying the invention.

FIG. 1 is a perspective view of a coupler/diverter embodying the invention and generally designated 10. It comprises a molded tubular body 12 having an upper end formed with an upward annular insert 14 threaded on the outside and secured into an annular channel 16 in the housing 12.

Inside the insert 14 is a resilient annular seal 18 (FIG. 4) which may be like that described in the U.S. Pat. No. 4,781,399 to Collon, assigned to my assignee. Above the threads the insert is provided with a plurality of windows 20 (FIGS. 1, 2) through which extend detents 22. The windows are spaced uniformly about the insert and the detents 22, the inner ends of which may be rounded, are connected together by a C-shaped wire 24 to generally bias the detents outward with respect to the opening in the insert. The unitary molding of the detents 22 and wire 24 serve also to keep the detents together. The upper end of the insert is provided with an outward flange 26.

An internal threaded collar 28 is formed with flutes 30 for gripping. It is reduced at its upper end to form a shoulder 32 which, at one end of the travel of the collar, stops against the flange 26. The shoulder 32 may slope downward toward the axis of the collar 28 and, as it is screwed upwardly on the threads 14, it cams the detents 22 in so that they poke inward through the windows 20.

Beneath the shoulder 32 the collar is provided with internal threads 34 (FIG. 4) which engage threads on insert 14. As a result of the structure shown, rotating the collar 28 upwardly will cause the detents 22 to move inward on the upward side of the attaching rib R of the spout nipple SN to hold the rib between the detents 22 and the inward stop flange 16a of the insert.

When it is desired to remove the coupler/diverter, the collar 28 is rotated rearwardly downward (FIG. 4a) so that the detents 22 retreat from the fixed nipple end and permit the downward movement of the coupler away from the nipple.

The lower end of the housing 12 is formed with a peripheral groove 36 into which the annular tongue 38 of the aerator skirt 40 snaps. The aerator skirt carries the aerator 42 which may be of various structure, for instance, as shown in U.S. Pat. No. 4,345,719 issued to Bock and assigned to my assignee. Preferably, the snapping cooperation of the inward rib 38 and the channel 36 sealingly secure the housing 12 and the skirt together.

Intermediate the upper and lower ends of the housing 12 is a transverse floor or wall 44. This comprises (FIG. 4) a single thickness web on the lefthand side, a unitary central barrel 46 extending with its axis on a diameter of the housing, and manifold 48. The transverse wall contains three parallel tubular connections terminating outwardly of the housing 12 in three hose nipples 50a, 50b, 50c having hose retaining barbs. The hose nipples (FIG. 2) are side-by-side (that is, coplanar) and parallel, have longitudinal passages, and receive individual hoses as will be explained. The hose nipples 50, 52, 54 are tubular, of course, and intercept the barrel 46.

Figure 4:
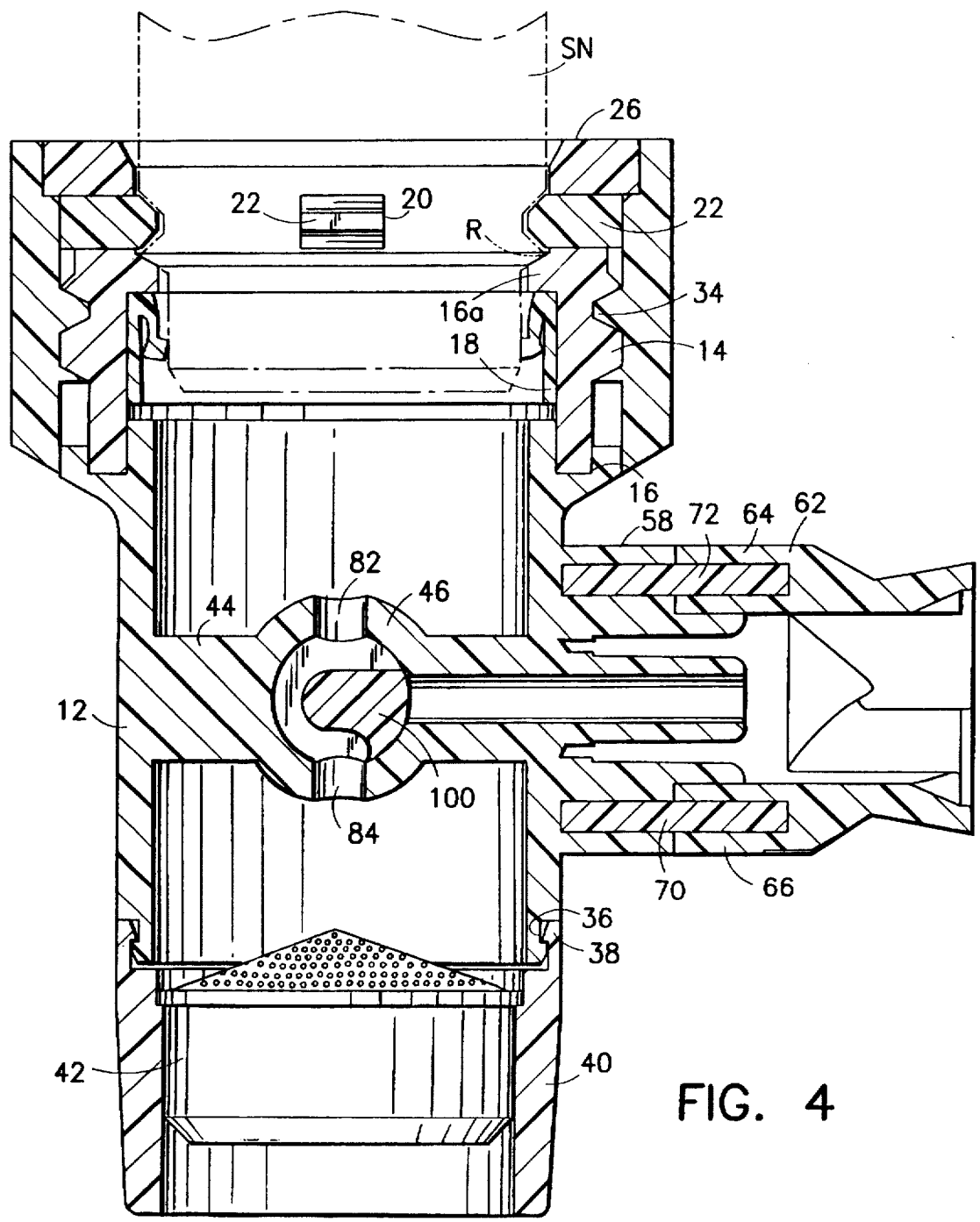
FIG. 4 is a sectional view taken on the line 4—4 of FIG. 1. The spout nipple is shown in phantom.
Figure 4A:
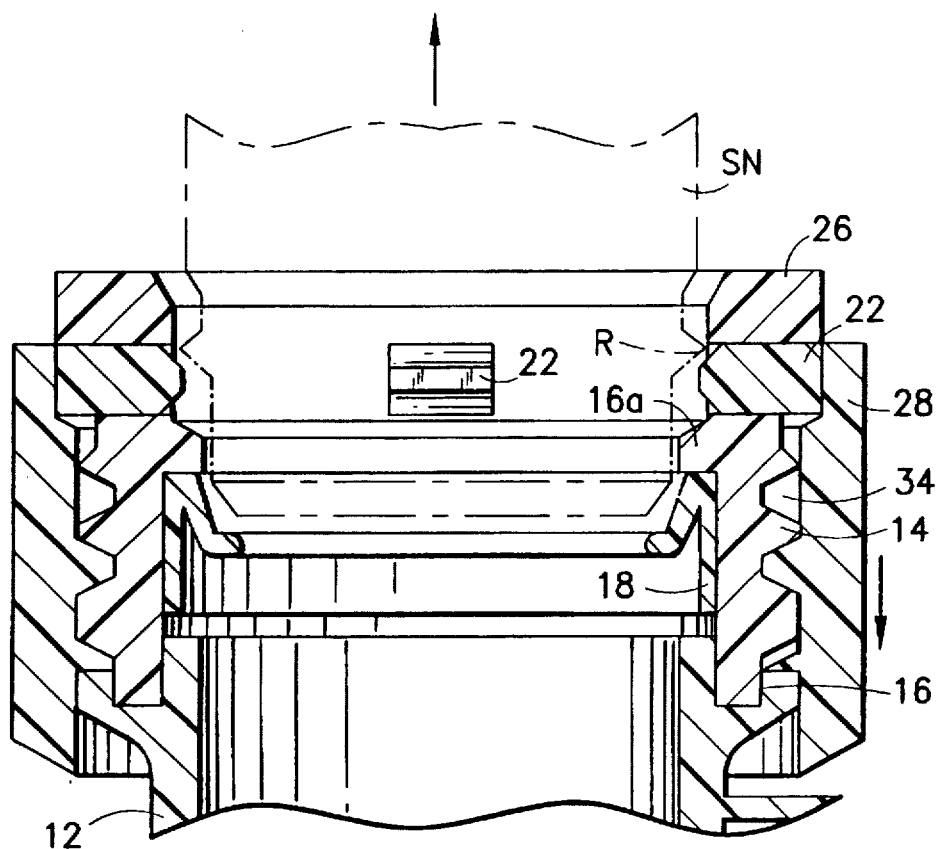
FIG. 4a is a fragmentary view showing the coupler/diverter being removed from the nipple, shown again in phantom.

The nipples are surrounded by an oval guard 56 which protects the connection with the hoses which are telescoped over the nipples in a conventional way. The upper and lower flat surfaces of the oval guard 56 are formed with unitarily molded boxes 58 and 60 having internal ribbed side walls. A flat bell 62 is provided to telescope over the guard 56. Its upper and lower surfaces are formed with boxes 64 and 66 (FIG. 4). The outer end of the bell 62 is formed with a generally rounded triangular (FIG. 2) opening 68 to help form the three hoses into a more compact package which may be covered by a surrounding shroud. The side walls of the boxes 64 and 66 are also formed with inward ribs, and barbed retaining tongues 70 and 72 ratchet into the boxes to hold the bell 62 solidly on the guard 56 after the hoses have been telescoped onto their respective nipples.

Figure 2:
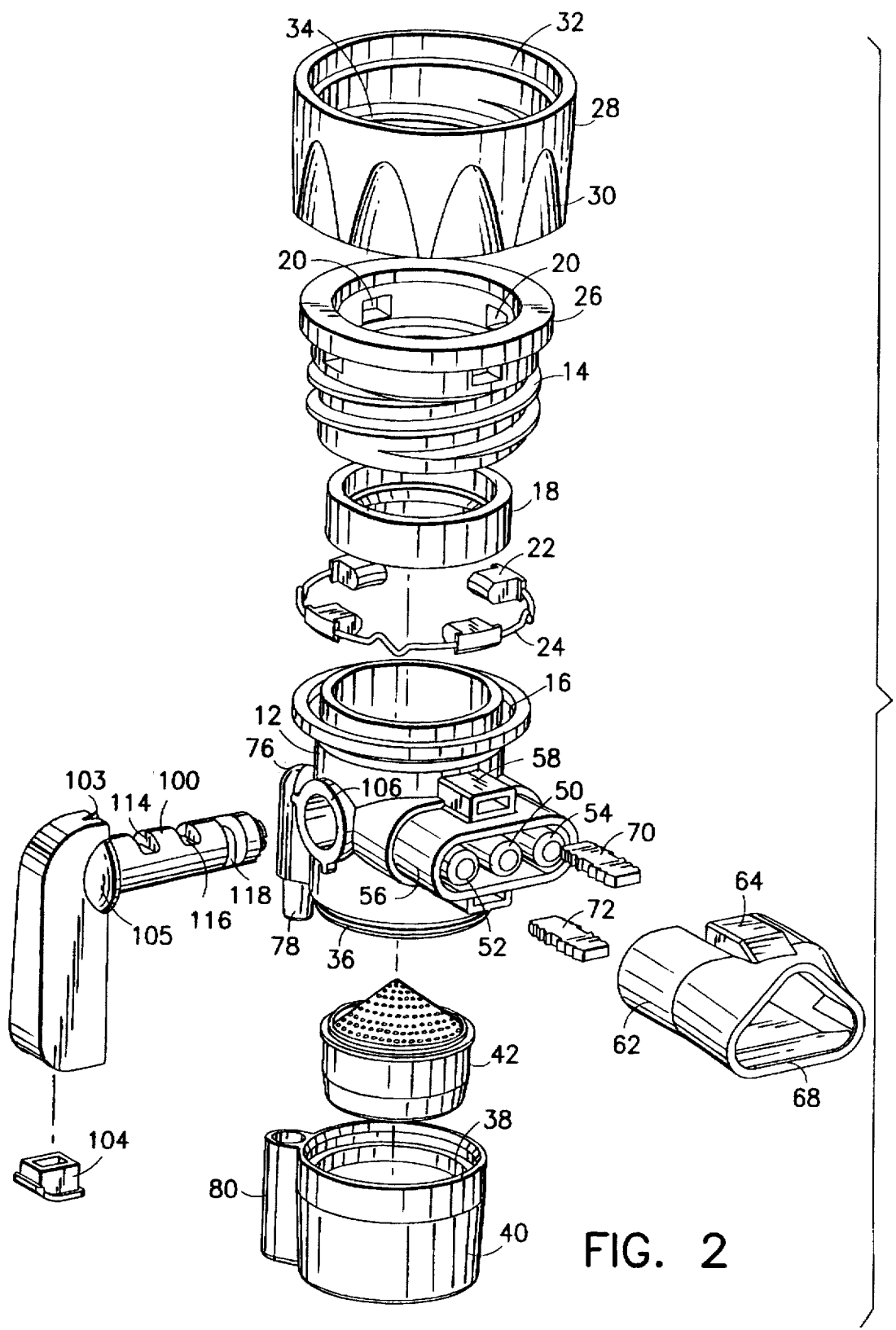
FIG. 2 is an exploded view.
Figure 3:
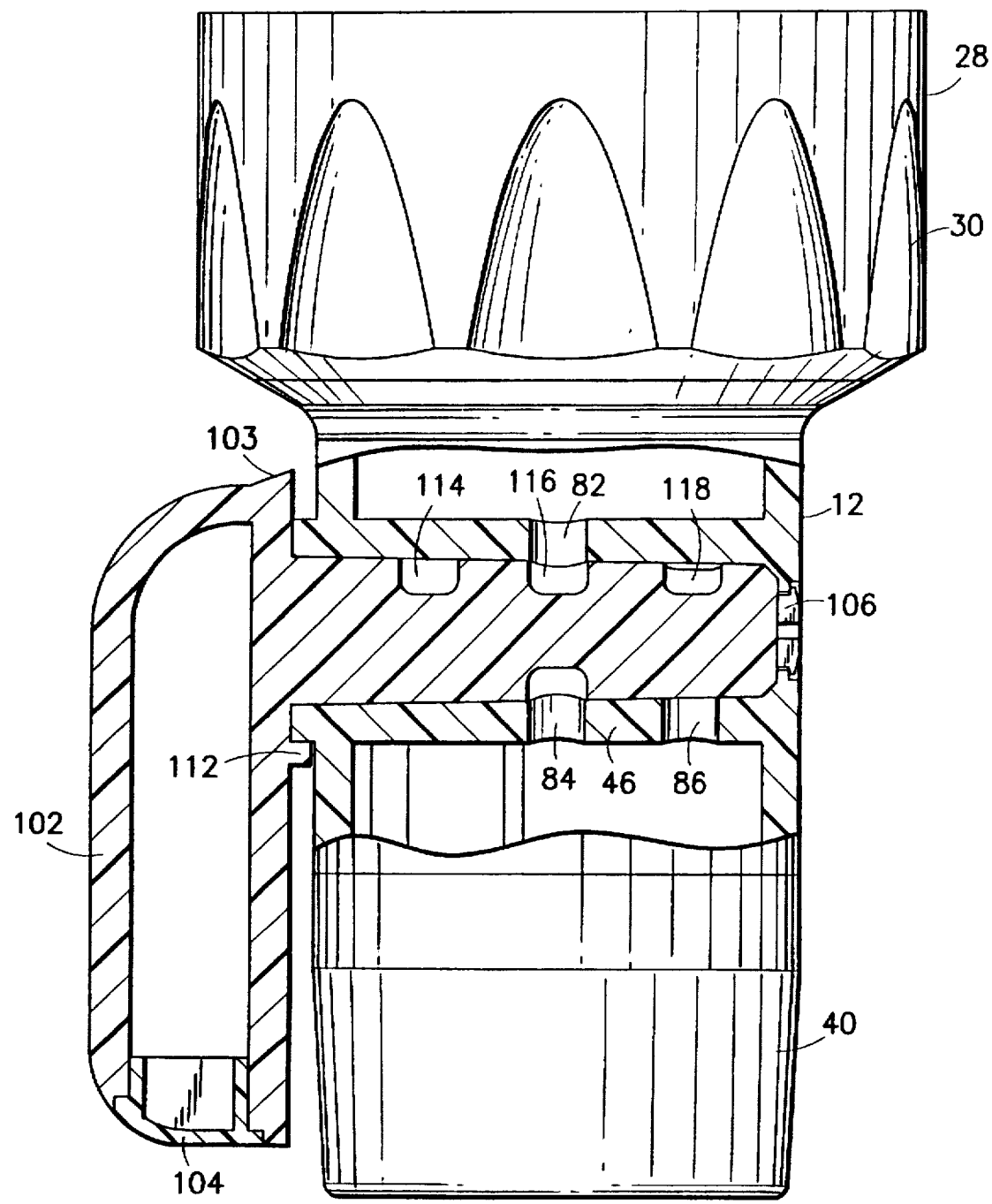
FIG. 3 is an enlarged side view partly broken away on the axial plane at line 3—3 of FIG. 1 to show the disposition of the parts.
Figure 6:
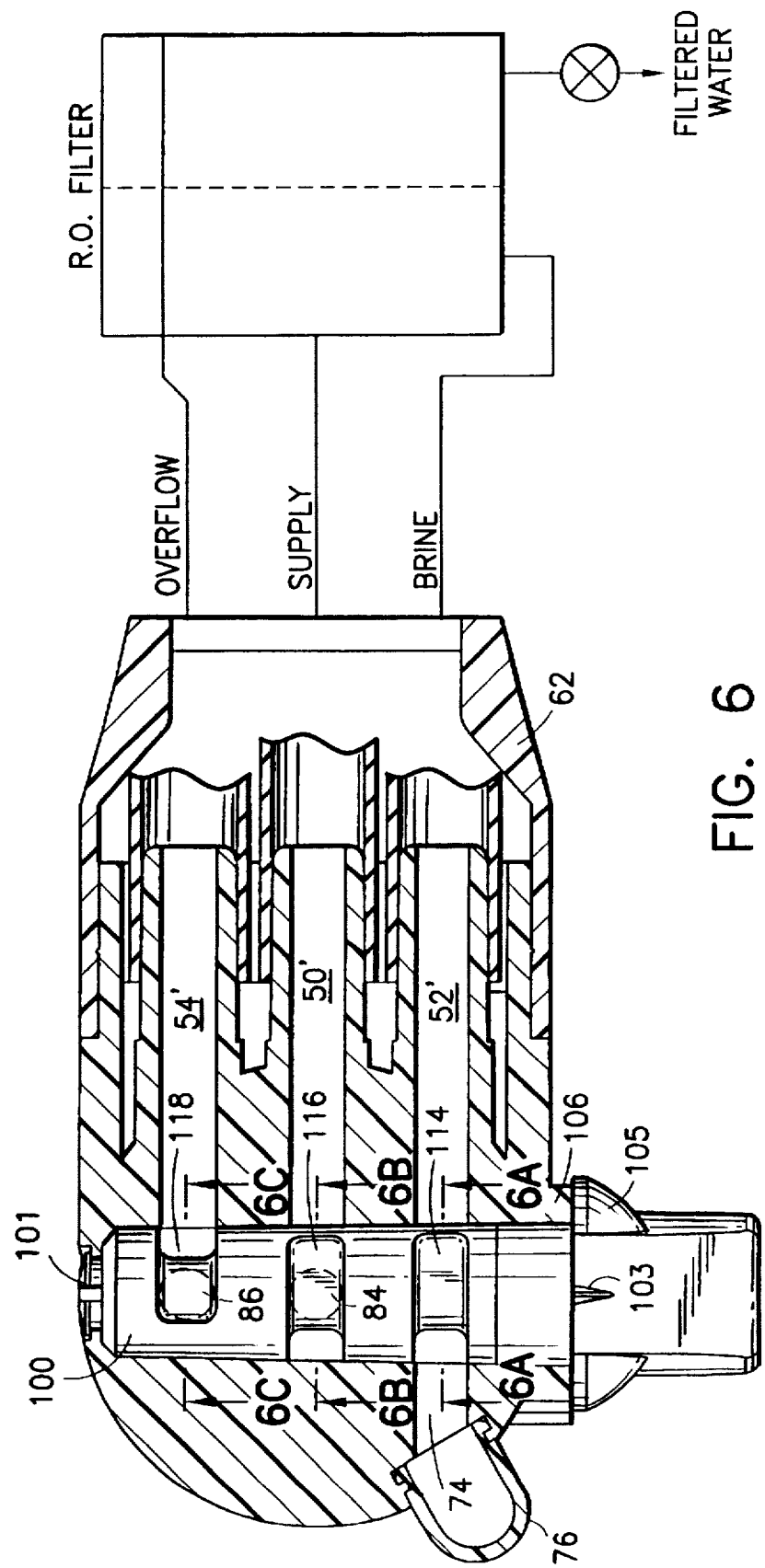
FIG. 6 is a sectional view taken on the line 6—6 of FIG. 5 and showing the hoses and filter in vertical section, schematic fashion.

The barrel 46 and wall 44 of the housing 12 are formed with additional passages. A short passage 74 (FIG. 6) is formed through the wall 44 (FIG. 4) and side wall of the housing 12 in line with the brine passage 52' from nipple 52. The housing 12 is channeled out where the passage 74 (FIG. 6) emerges and formed with a brine discharge elbow 76 reduced at its lower end 78 and received into a brine discharge nozzle 80 unitarily molded on the aerator skirt 40 (FIG. 2).

Figure 8A:
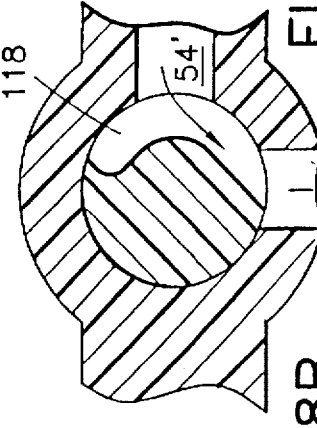
FIGS. 8A, 8B and 8C are taken respectively on the lines 8A—8A, 8B—8B and 8C—8C of the stem and handle setting of FIGS. 7 and 8.

On the radial plane of the barrel 46 where the supply passage 50' to nipple 50 (FIGS. 4, 6B) intersects the barrel are the ports 82 and 84. On the radial plane where the overflow nipple passage 54' from nipple 54 (FIG. 6C) intersects the barrel 46, a downward port 86 is provided. Ports 84 (FIG. 6B) and 86 (FIG. 8C) direct faucet water and filtered overflow downward into the aerator 42.

A valve control stem 100 (FIG. 2) is provided and is generally of tapered cylindrical configuration. To its outward end is unitarily molded at right angles a handle 102 provided with a pointer 103 to cooperate with indicia (not shown) molded into the side wall of the housing. The handle is fitted with a cosmetic insert 104 to plug the molded opening in its lower end. The stem 100 at its end opposite the handle 102 receives a retainer bolt 101 (FIG. 6), holding the stem 100 snugly in the barrel.

Figure 5:
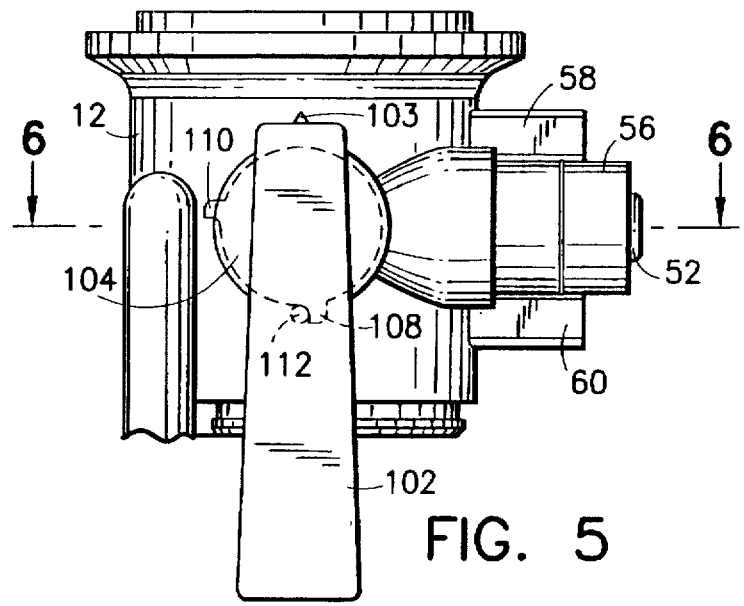
FIG. 5 is a side elevational view showing the handle in downward position.
Figure 7:
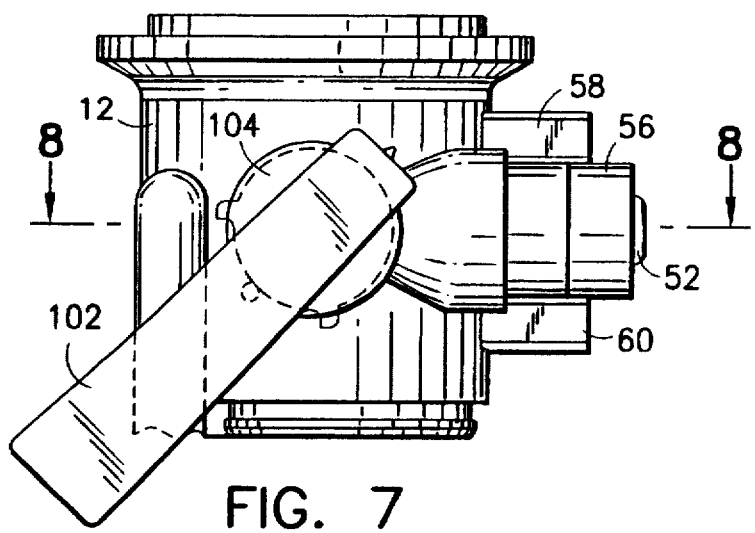
FIG. 7 is a side elevational view showing the handle at 45° setting.
Figure 9:
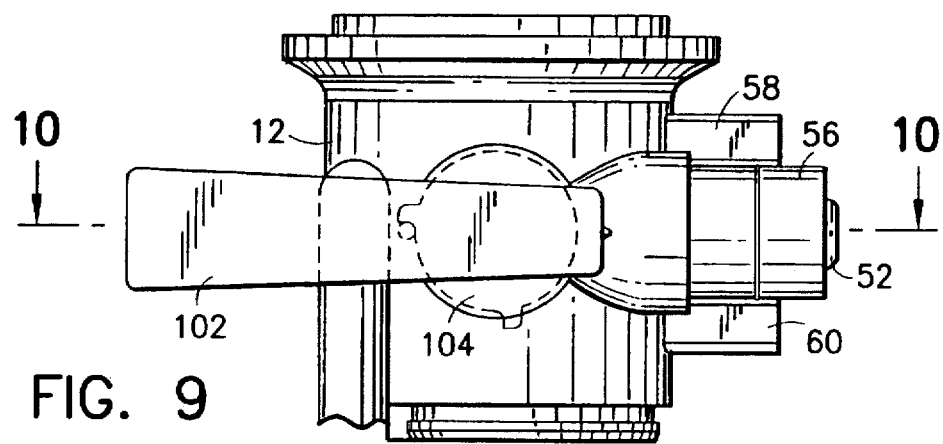
FIG. 9 is a side elevational view of a housing wherein the handle is at the horizontal position.

If desired, the handle 102 (FIG. 2) may be formed with a circular bearing hub 105 concentric with the axis of the stem to bear against a boss surface 106 molded in the housing 12. The boss surface (FIG. 5) is formed with radial stops 108 and 110 disposed at 90° to each other. The handle 102 is formed with a pin 112 for cooperation with the stops 108 and 110 to limit rotation of the stem.

Figure 10A:
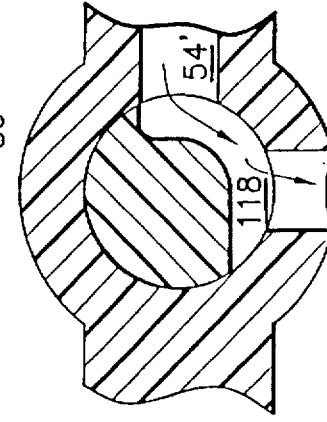
FIGS. 10A, 10B and 10C are taken on the lines 10A—10A, 10B—10B and 10C—10C of FIG. 10.

As shown in FIG. 2, the stem 100 is formed therealong with spaced passages or channels specifically designed to route liquid out the desired port in the barrel. Thus, the brine channel 114 as shown extends more than half way about the circumference of the stem and is adapted when set in the positions of FIGS. 8A and 10A to pass brine to a greater or lesser extent (FIG. 10A lesser than FIG. 8A) to the brine passage 74 and out the discharge elbow 76, 80.

Figure 8B:
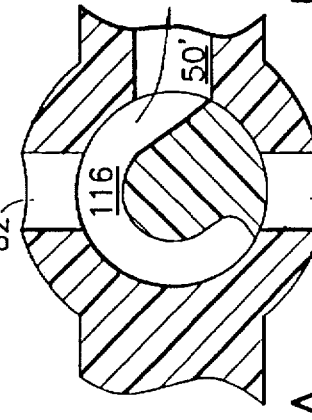
Figure 10B:
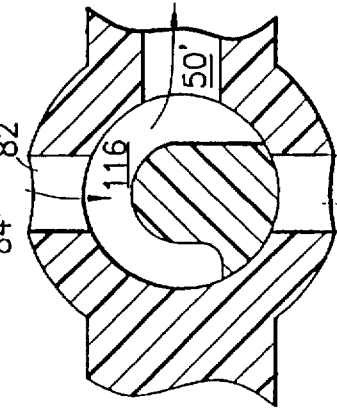
Figure 8C:
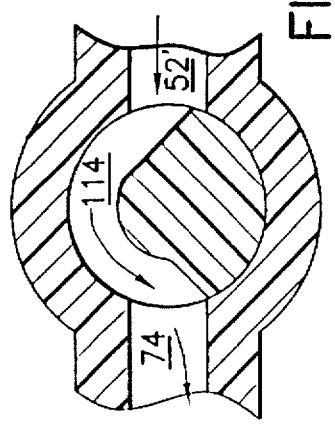
Figure 10C:
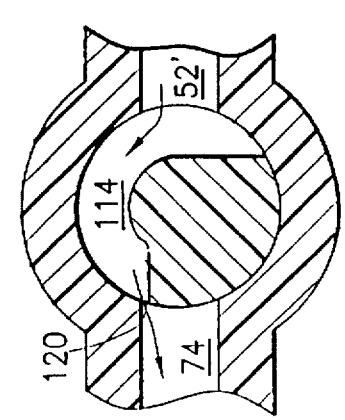
Figure 8:
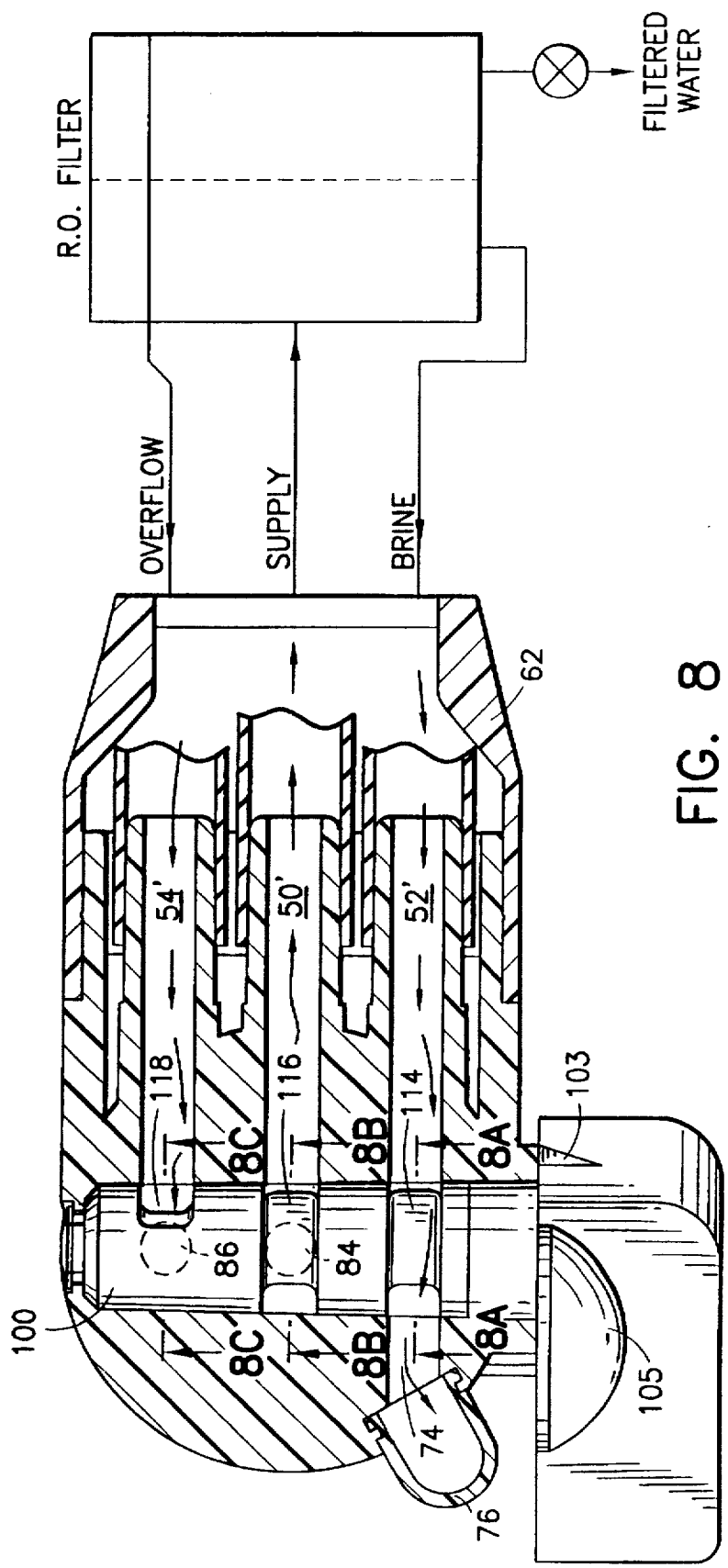
FIG. 8 is a sectional view taken on the line 8—8 of FIG. 7 and showing the hoses and filter in vertical section, schematic fashion.
Figure 10:
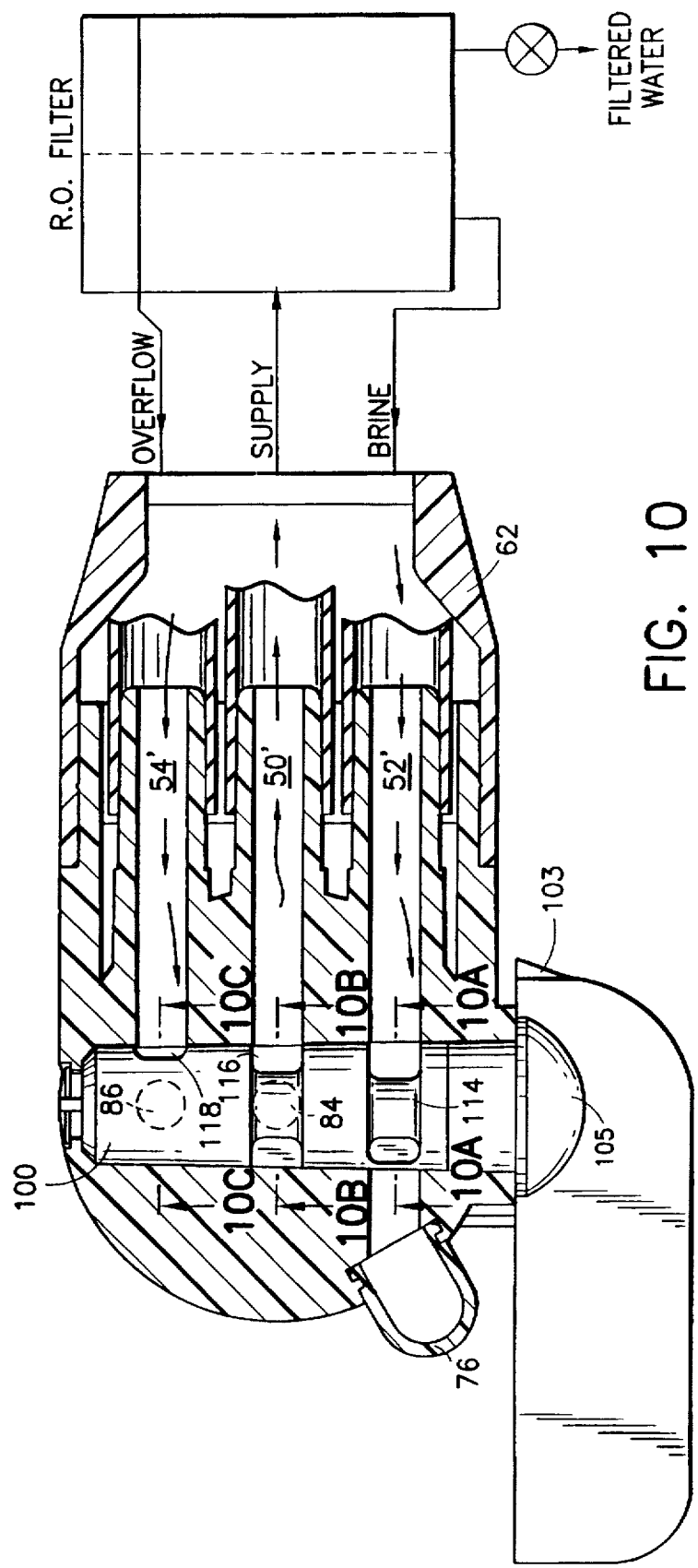
FIG. 10 is a view taken on the section line 10—10 of FIG. 9 and showing the hoses and filter in vertical section, schematic fashion.

Channel 116 in the stem in line with the supply nipple passage 50' will pass the faucet water from the port 82 to the discharge port 84 or to the nipple passage 50 as in FIG. 8B and 10B, depending on the setting of handle 102.

The channel 118 in the stem which is in line with the nipple passage 54 will either shut off the overflow passage (FIG. 6C) or permit passage to the overflow port 86, depending on the setting of the handle.

Figure 6A:
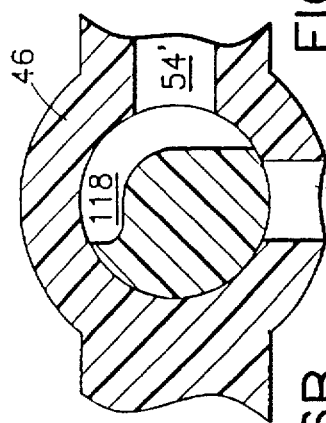
FIGS. 6A, 6B and 6C are sectional views taken on the respective lines 6A—6A, 6B—6B and 6C—6C of FIG. 6.
Figure 6B:
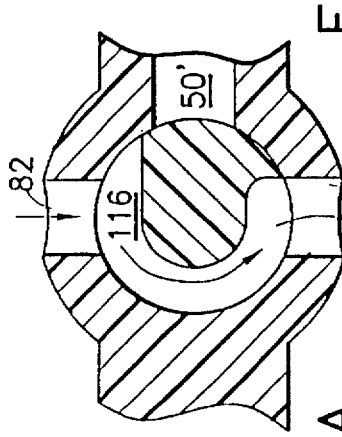
Figure 6C:
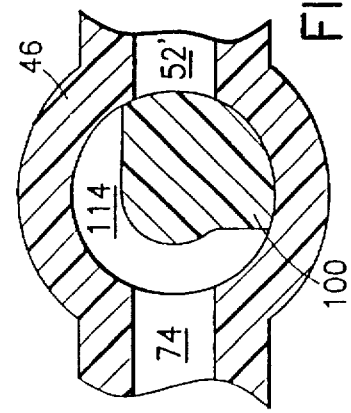

To further define parts of the coupler/diverter, reference is now made to the sheet of drawings including FIGS. 6A, B, C; FIGS. 8A, B, C and FIG. 10A, B, C. The barrel 46 is formed as stated with the ports 82 and 84 in line with the supply channel 116. In more detail, the supply passage means includes (FIG. 6B) not only these ports, but specifically, the supply channel inlet opening 82A and the supply channel outlet opening 50'A. There is also the second supply outlet opening 84A. The filter overflow passage means includes (FIG. 6C) not only passages 54' and 86 aligned with the overflow channel 118 in the stem, but also the overflow inlet opening 54'A in the barrel and the overflow outlet opening 86A. The brine return passage means (FIG. 6A) includes not only the passage 52' and the outlet passage 74 aligned with channel 114, but, more specifically, the brine return inlet opening 52'A and the brine return outlet opening 74A.

By virtue of the structure described, the coupler/diverter, depending on the setting of the handle 102, accomplishes the following desired results: With the pointer 103 pointing straight up (FIGS. 1, 2, 6, 6B, 6C), which may be called the "first setting", faucet water flows through the channel 116 and out the passage 84 to flow to the aerator 42 and be transformed into an aerated stream for washing the hands, etc. The nipple passages 50, 52 and 54 are all closed. At this setting the coupling may be safely removed from the spout nipple SN end. |with| There will be no surprise shower bath as the coupler is removed. The user has knowledge that the faucet is off (because flow out the orifice 40 is stopped). Further, from the coupler there will be no leakage of hose liquids because the stem 100 blocks off connections with all hoses.

When the pointer 103 is in the 45° position (FIGS. 7, 8, 8A, 8B, 8C), which may be called the "second setting", the brine return through nipple channel 52' passes through passage 114 in the stem and freely out passage 74 to the brine discharge elbow 76, 80. This is a brine flushing position used to flush the accumulated residue on the filter. The faucet water supply through channel 82 moves through passage 116 and out the supply passage nipple 50 (FIG. 8B). The overflow through nipple passage 54' passes through channel 118 to the aerator outlet 86 (FIG. 8c) and through the aerator into the sink as waste.

With the pointer 103 in the horizontal position (referred to for simplicity in the claims as the "third setting") shown in FIGS. 9, 10, 10A, 10B, 10C, the brine discharge through nipple passage 52' passes through passage 114 and is metered by the crack opening 120 between channel 114 and discharge passage 74 to dribble out the brine elbow discharge 76, 80. This brine return metering is normal operating condition for the filter. It is important to note that the pointer 103 during normal operating condition may not be exactly horizontal but handle 102 may be turned so that the pointer may point upward slightly to open crack 120 more to an actual operating position found empirically where the compromises of highest reasonable water quality of the throughput and highest reasonable volume of the throughput are resolved. This judgment call on the part of the user may be reflected in the indicia (not shown) by a kind of curved triangle molded into the housing 12 at this area.

In the third setting the faucet water through passage 82 moves out nipple passage 50' (FIG. 8A) to the upstream side of the RO filter for filtration. The overflow through overflow nipple channel 54' moves through passage 118 of the stem 100 and out the passage 86 through the aerator 42 to the sink drain.

In the drawings the hoses and RO filter with its filtered water outlet are shown in schematic fashion. Their specific structure is not relevant to the present invention. The coupler/diverter of the invention can be used with RO filters of various types.

It will be understood by those skilled in the art that the coupler/diverter of the present invention serves not only to supply water to and otherwise serve a reverse osmosis filter, but it also alternatively functions as the usual faucet aerator producing a smooth aerated stream of faucet water. Moreover, the coupler/diverter of the invention provides positive means for shutting off the hoses to and from the filter so that the coupling may be disconnected from the spout nipple SN without spillage. It provides, when in use as a diverter, a simple free flow flush setting for the brine return as well as a metered brine return setting for normal operation.

Variations in the invention are possible. Thus, while the invention has been shown in only one embodiment, it is not so limited but is of a scope defined by the following claim language which may be broadened by an extension of the right to exclude others from making, using or selling the invention as is appropriate under the doctrine of equivalents.

What is claimed is:

1. A coupler/diverter for connection to a faucet spout to serve a reverse osmosis filter comprising:
   a. a housing having an inlet end and an outlet end,
   b. quick-connect coupling means at the inlet end of the housing adapted to engage the spout,
   c. respective supply, overflow and brine return hose nipples extending laterally off adjacent the outlet end of the housing,
   d. a single rotary multi-port valve in the housing comprising a wall disposed transversely of the housing, a barrel disposed lengthwise of the wall and a stem rotatably disposed snugly in the barrel, the stem having respective supply, overflow and brine return partial circumferential channels spaced longitudinally therealong,
   e. supply passage means in the housing connecting the upper inlet end to a supply inlet opening in the barrel radially aligned with the supply channel and a supply outlet opening in the barrel aligned with the supply channel and connecting the supply outlet opening to the supply nipple,
   f. overflow passage means in the housing connecting the overflow nipple to an overflow inlet opening in the barrel aligned with the overflow channel and an overflow outlet opening in the barrel aligned with the overflow channel and connecting the overflow outlet opening and the lower outlet end, and
   g. brine return passage means in the housing connecting the brine return nipple to a brine return inlet opening the barrel aligned with the brine return channel and a brine return outlet opening in the barrel aligned with the brine return channel and connecting the brine return outlet opening to a discharge outlet from the housing separate from the outlet end,
   the positions of the openings in the barrel and the positions of the partial channels being such that the channels will respectively connect the openings aligned with the respective channels at various rotary settings of the stem.

2. A coupler/diverter as claimed in claim 1 wherein an aerator is mounted on the outlet end.

3. A coupler/diverter as claimed in claim 1 wherein the coupling means comprises a tubular fitting having a central opening adapted to receive the spout, the spout having adjacent its end an inward retaining surface, the fitting formed with a plurality of inwardly facing radial windows about the opening, a plurality of detents disposed in the windows respectively, and a locking collar surrounds the fitting and has a locking position thereon at which it holds the detents inward adapted to lock the detents inward at the retaining surface to hold the fitting on the spout.

4. A coupler/diverter as claimed in claim 3 wherein the detents are unitarily formed being connected by a slender C-shaped unitary retaining filament.

5. A coupler/diverter as claimed in claim 1 wherein the stem extends external of the housing and a handle is connected perpendicularly to the stem external of the housing to rotate the stem to the respective settings and the settings include a brine flush setting whereat the brine return channel connects the brine return opening, and a brine metered setting whereat an end of the brine return channel partially occludes one of the brine return openings.

6. In combination with the coupler/diverter of claim 1, a reverse osmosis filter comprising:
   a. a container having a filter membrane extending thereacross and partitioning the container into an inlet side and an outlet side,
   b. a supply hose connecting the supply nipple and the inlet side,
   c. an overflow hose connecting the outlet side spaced above the bottom of the container and the overflow nipple, and
   d. a brine return hose connecting the inlet side adjacent the membrane and the brine return nipple.

7. A coupler/diverter as claimed in claim 6 wherein the nipples are barbed and formed unitary with the housing.

8. A coupler/diverter as claimed in claim 1 wherein the brine return discharge outlet is in the form of an elbow fitting exterior of the housing and directing the brine return discharge in a direction longitudinally away from the housing.

9. A coupler/diverter as claimed in claim 1 wherein a flow-through passage means is formed in the housing comprising a second supply outlet opening in the barrel aligned with the supply channel and connecting the second supply outlet opening and the outlet end.

10. A coupler/diverter as claimed in claim 1 wherein the supply, overflow and brine return hose nipples are parallel and in the same plane, an oval guard formed in the housing and surrounding the nipples, and a ball is provided having an oval inner end to connect with the guard and an outer end having a rounded triangular opening adapted to help form three hoses engaging the respective nipples into a more compact package.

11. A coupler/diverter for connection to a faucet spout to serve a filter comprising:
   a. a housing having an inlet end and an outlet end,
   b. quick-connect coupling means at the inlet end of the housing adapted to engage the spout,
   c. respective supply and filtered water barbed hose nipples extending laterally off adjacent the outlet end of the housing,
   d. a single rotary multi-port valve in the housing comprising a wall disposed transversely of the housing, a barrel disposed lengthwise of the wall and a stem rotatably disposed snugly in the barrel, the stem having respective supply and filtered water partial circumferential channels spaced longitudinally therealong,
   e. supply passage means in the housing connecting the upper inlet end to a supply inlet opening in the barrel radially aligned with the supply channel and a supply outlet opening in the barrel aligned with the supply channel and connecting the supply outlet opening to the supply nipple,
   f. filtered water passage means in the housing connecting the filtered water nipple to a filtered water inlet opening in the barrel aligned with the filtered water channel and a filtered water outlet opening in the barrel aligned with the filtered water channel and connecting the filtered water outlet opening and the outlet end,
   g. flow-through passage means formed in the housing comprising a second supply outlet opening in the barrel aligned with the supply channel and connecting the second supply outlet opening and the outlet end, and
   h. an aerator mounted on the outlet end of the housing, the positions of the openings in the barrel and the positions of the partial circumferential channels being such that the channels will respectively connect the openings aligned with the respective channels at various rotary settings of the stem and one of the filtered water outlet opening and supply water outlet opening is positively closed off by the stem when the other of the filtered water outlet opening and supply outlet opening is open.

* * * * *

UNITED STATES PATENT AND TRADEMARK OFFICE
CERTIFICATE OF CORRECTION

PATENT NO. : 5,795,475

DATED : 8/18/98

INVENTOR(S) : luedke et al.

It is certified that error appears in the above-identified patent and that said Letters Patent is hereby corrected as shown below:

Column 5, line 46, cancel "(Fig. 8A)" insert --(Fig. 8B)--.

Column 5, line 49, after "86" insert --(Fig. 10C)--.

Signed and Sealed this

Twenty-third Day of February, 1999

*Attest:*

Q. TODD DICKINSON

*Attesting Officer*     *Acting Commissioner of Patents and Trademarks*